Patented Oct. 31, 1939

2,178,510

UNITED STATES PATENT OFFICE 2,178,510

REMOVAL OF CHLORIDES FROM SOLUTIONS OF AMINO ACIDS

Louis Gerber, Peoria, Ill., assignor, by mesne assignments, to Corn Products Refining Company, New York, N. Y., a corporation of New Jersey No Drawing. Application June 20, 1938, Serial No. 214,729

2 Claims. (Cl. 260—534)

This invention relates to processes for obtaining amino acids, such as glutamic acid, leucine, tyrosine, or other amino acid or amino acids, as may be desired, from protein or protein-containing-substance in which the amino acid solution at some stage of the process contains an inorganic chloride or chlorides, for example, sodium chloride, or potassium chloride and/or ammonium chloride, the presence of which interferes with or makes difficult the isolation and recovery of the desired amino acid or acids and tends to contaminate the product or products when obtained.

It is the object of the present invention to provide a simple and effective method for removing such salts from the amino acid solution.

Amino acids are produced by the hydrolysis of protein substances and it is believed that the hydrolysis of most vegetable protein substances yields some seventeen amino acids. These acids have different solubility characteristics and processes aiming at the isolation and recovery of any particular amino acid or acids such control solubility conditions in the solution so that a particular amino acid or acids may be precipitated or crystallized while other acid or acids remain in solution. The hydrogen ion concentration of the solution is a factor determining insolubility, and as (in the common case of a hydrolysate produced by the acid hydrolysis of protein substance) the pH of the hydrolyzed solution is very low, being around pH 0.1 to 0.2, neutralization to a greater or lesser extent is frequently necessary in order to raise the pH to the proper level for precipitation of the desired amino acid or acids. This neutralization results in the formation of sodium chloride, for example, if the hydrolyzing acid is hydrochloric acid, and the neutralizing agent sodium hydroxide, as is most common. Another salt, ammonium chloride, results from the combination of the hydrolyzing agent, hydrochloric acid, with the ammonia which is produced, to some extent, in the hydrolyzing operation. If potassium hydroxide were used as a neutralizing agent, the neutralized solution would contain potassium chloride. These inorganic chlorides are objectionable for the reasons stated; and the present invention is based upon the discovery that they may be removed by bubbling hydrogen chloride through the amino acid solution containing the inorganic chloride or chlorides, which, under these conditions, will be precipitated and may be removed by filtration or by other suitable separating operation.

The temperature of the liquor during the treatment with the hydrogen chloride gas may be anywhere between 30° and 120° F. The temperature will be selected so as to avoid temperatures at which the amino acid or acids to be ultimately recovered tend to precipitate; temperature, as well as pH (and, of course, the density of the solution) being a factor determining solubility or insolubility.

Preferably the gas treatment is carried out in two stages, the first at a relatively high temperature and the second, after removal of precipitated salts, at a lower temperature. The reason for this is that at the higher temperatures there is less chance of precipitation of amino acids. Most of the chlorides will come out at the higher temperature, leaving a small amount for the second treatment at the lower temperature, at which stage the salt is less soluble and more hydrogen gas absorption can take place.

Under ordinary conditions the temperature during the first stage will be 100° to 120° F. and 70° to 80° F. in the second stage. During these treatments the intention is to keep the solution as fully saturated with the gas as possible. Under these conditions the time will be from 25 to 35 minutes in the first stage and from 10 to 15 minutes in the second stage.

The treatment with hydrogen chloride gas can be carried on with the liquor at any pH.

The process of this invention is applicable to the treatment of any solutions of amino acids containing alkali metal and/or ammonium chlorides. The invention is not limited to treatment of hydrolysates which have been neutralized with alkaline substances but is applicable to any solution of amino acids containing the before-mentioned salts. For example, sodium chloride as such may be introduced in an amino acid solution and after it has served its purpose, it may be desirable to remove the salt. The invention is applicable to amino acid solutions obtained from animal as well as vegetable protein substance by whatever process may be used.

The following is a specific example illustrating the employment of the invention as a step in the process of obtaining glutamic acid and/or leucine and tyrosine from corn gluten. It will be understood, however, that this example is purely informative and typical. The invention is not limited to this particular process nor to the particulars given in the example. The intention is to cover all equivalents of the means and agents specified and all modifications of the invention within the scope of the appended claims.

*Example.*—100 parts, by weight, of starch-free corn gluten is boiled for twenty hours under a reflux condenser with 400 parts of 20% hydrochloric acid. The solution is then cooled to 140° F., centrifuged to remove humin substances and evaporated to a density of 30° Baumé. Caustic soda is added in sufficient quantity to raise the hydrogen ion concentration to 6.4 pH. At this temperature and pH the leucine and tyrosine are precipitated and may be removed by filtration.

The filtered solution will contain the sodium salts of the amino acids other than tyrosine and leucine and also sodium chloride and some ammonium chloride.

The liquid is placed in an acid resistant container into which is introduced, through the bottom, a stream of hydrogen chloride gas for 45 minutes with the temperature of the liquor maintained between 100° and 120° F. by means of a cooling coil. The precipitate is then removed by filtration, the filtrate cooled to 70°–80° F. and the hydrogen chloride gas bubbled through the liquid maintained at 70°–80° F. The liquid is then again filtered. This will remove substantially all of the sodium and ammonium chlorides. The amount of salt precipitated from 1500 cc. of liquor, for example, will be about 300 grams, 285 grams of sodium chloride and 15 grams of ammonium chloride. The clarified solution may then be treated in any suitable manner for the production of glutamic acid, for example by the process described and claimed in application for United States patent of J. Paul Bishop, Serial No. 178,428, filed December 6, 1937. The leucine-tyrosine precipitate may be treated for the isolation, recovery and refinement of tyrosine and for leucine by any suitable process, for example, by the process described and claimed in the application for United States patent of Louis Gerber, Serial No. 214,730, filed June 20, 1938. These operations form no part of the present invention.

I claim:

1. Method of treating a solution of amino acids containing chlorides of the group consisting of sodium chloride, potassium chloride and ammonium chloride which comprises: passing hydrogen chloride gas through the solution with the solution at a temperature between 100° and 120° F.

2. Method of treating a solution of amino acids containing chlorides of the group consisting of sodium chloride, potassium chloride and ammonium chloride which comprises: passing hydrogen chloride gas through the solution with the solution at about 100°–120° F.; removing the precipitate; repeating the gas treatment with the solution about 70°–80° F., and removing the precipitate.

LOUIS GERBER.